(No Model.)  3 Sheets—Sheet 1.
G. F. STEEDMAN.
SHINGLE SAWING MACHINE.
No. 603,928. Patented May 10, 1898.
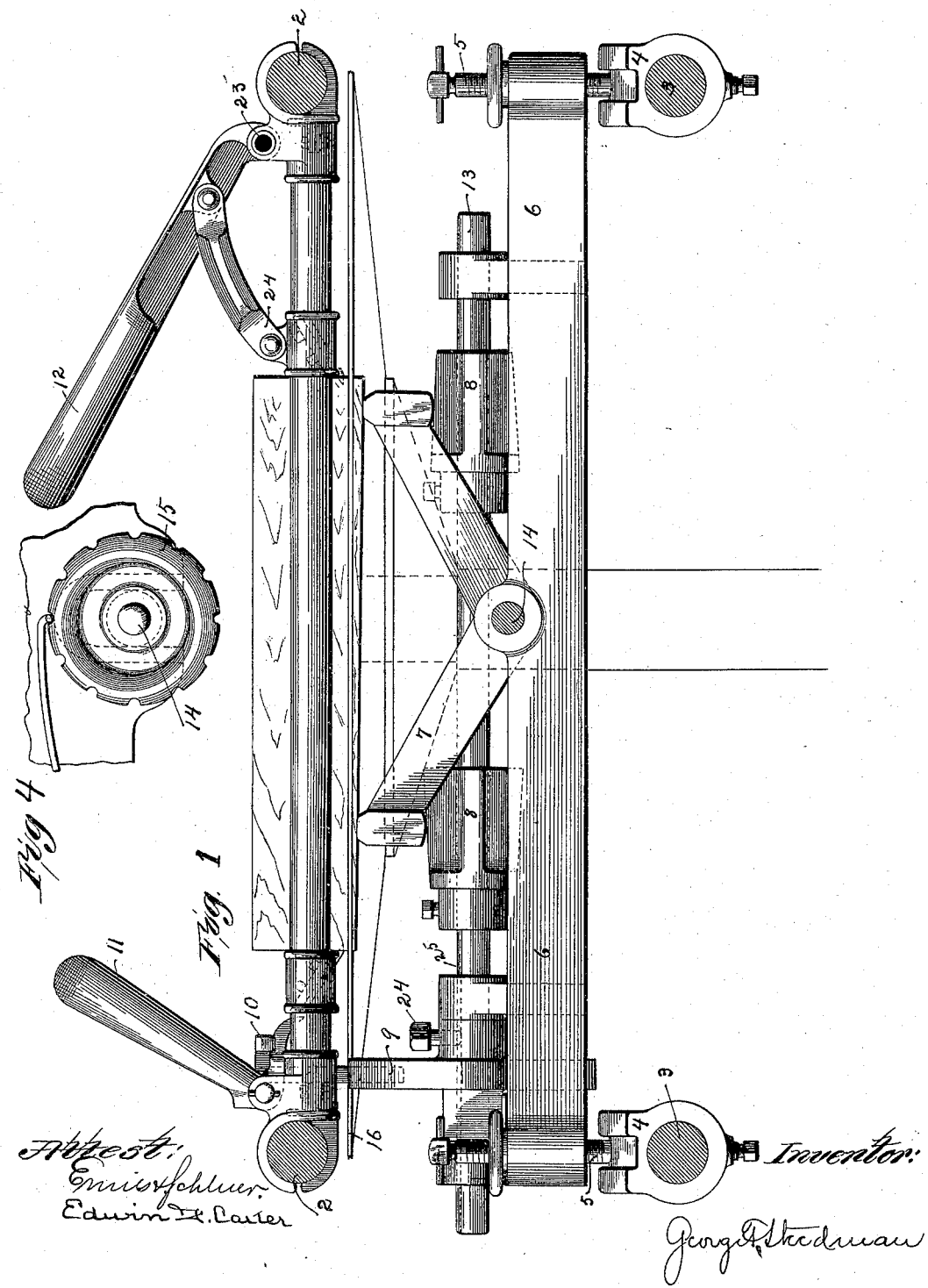

(No Model.) 3 Sheets—Sheet 2.
G. F. STEEDMAN.
SHINGLE SAWING MACHINE.
No. 603,928. Patented May 10, 1898.
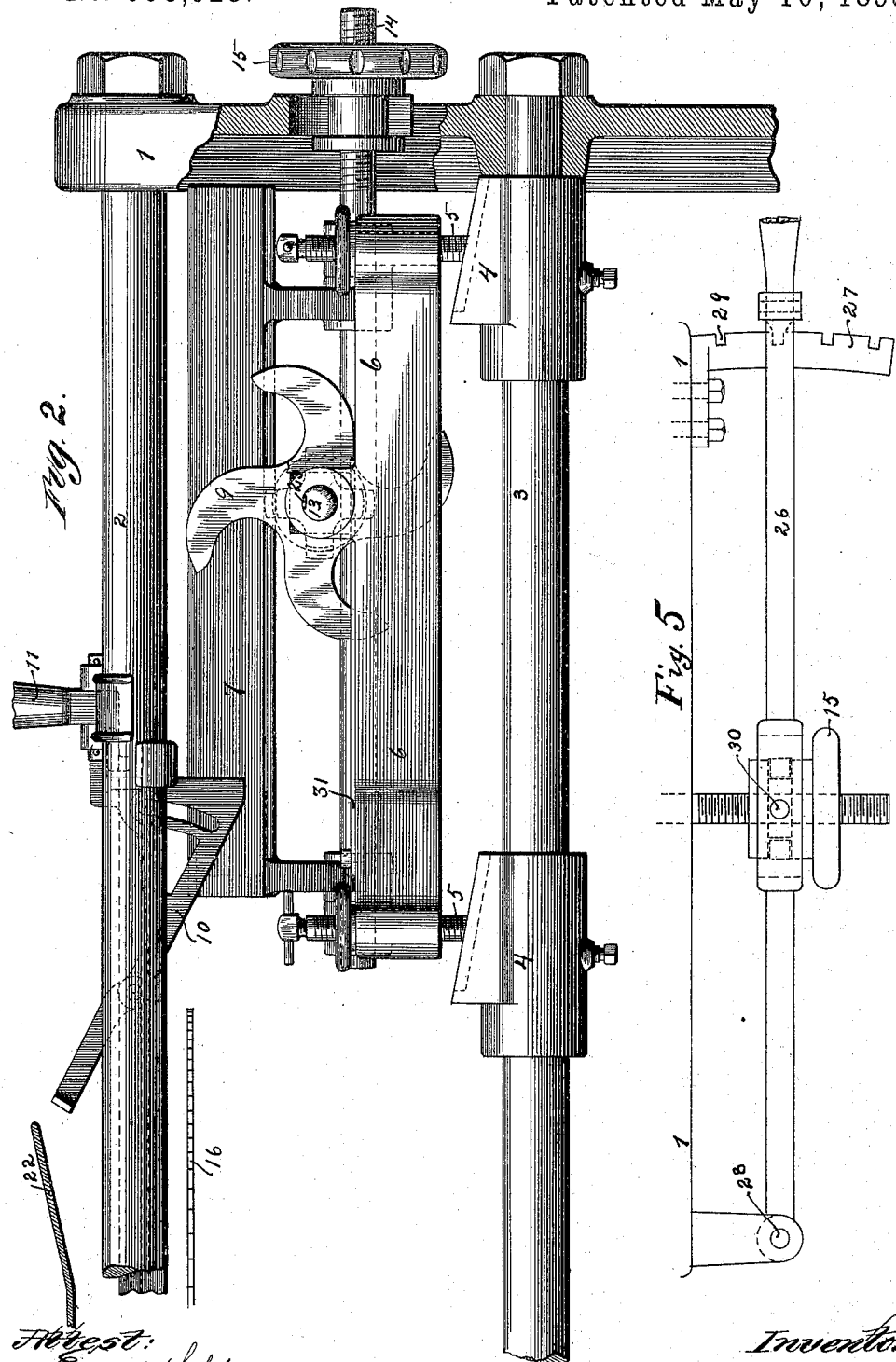

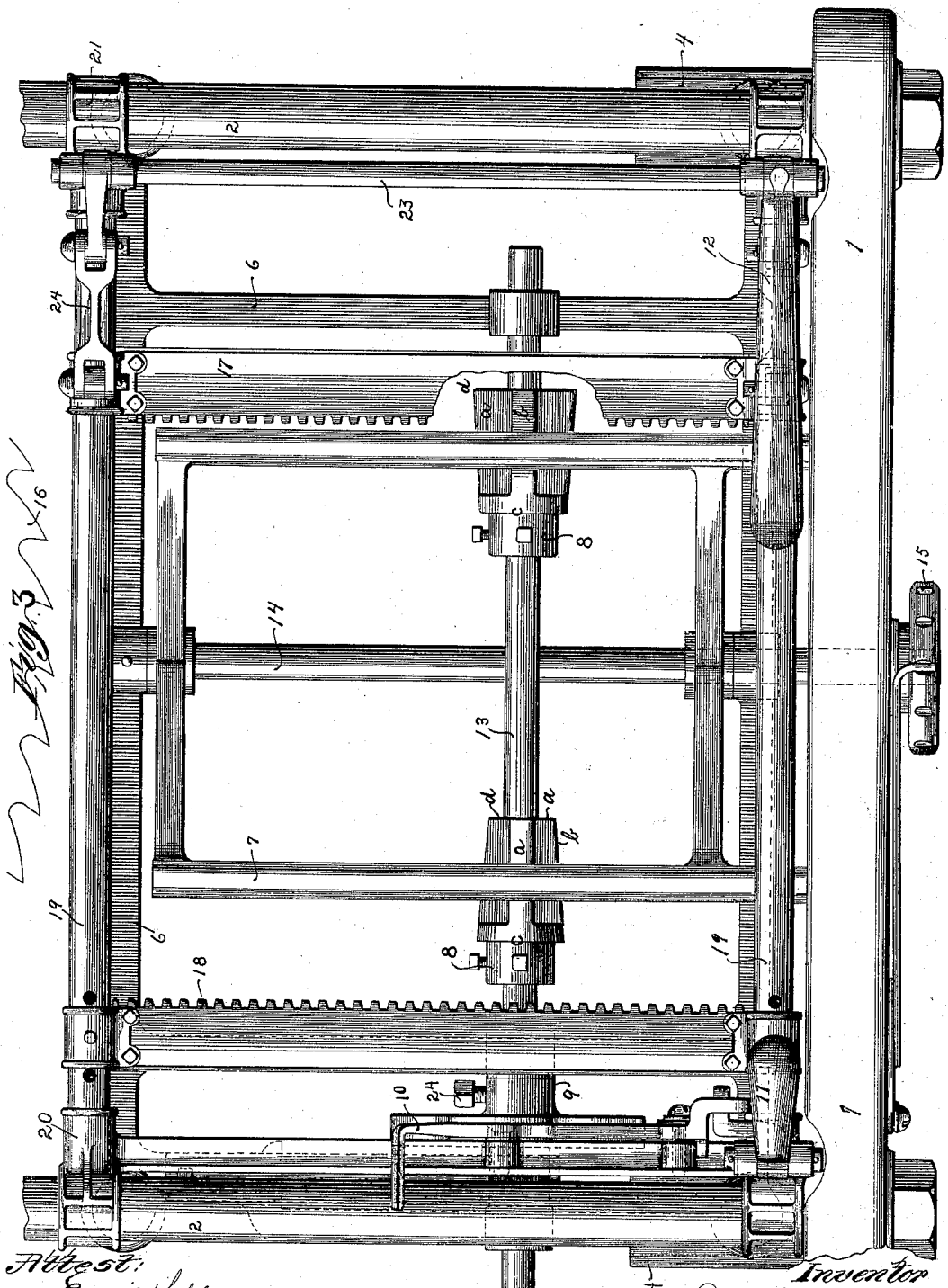

UNITED STATES PATENT OFFICE.

GEORGE F. STEEDMAN, OF ST. LOUIS, MISSOURI.

SHINGLE-SAWING MACHINE.

SPECIFICATION forming part of Letters Patent No. 603,928, dated May 10, 1898.

Application filed August 3, 1896. Serial No. 601,573. (No model.)

*To all whom it may concern:*

Be it known that I, GEORGE F. STEEDMAN, a citizen of the United States, residing at St. Louis, in the State of Missouri, have invented new and useful Improvements in Shingle-Sawing Machinery, of which the following specification, in connection with the annexed drawings, is a full and exact description, enabling any one skilled in the art to which this invention belongs to make and use the same.

My invention relates to improvements in shingle-sawing machines in which a rotary circular saw rotating in a horizontal plane operates in conjunction with a block-carrying carriage moving slightly above and parallel with said saw and an automatic tilting mechanism in front of and slightly below plane of said saw; and the objects of my invention are, first, to provide a means of conveniently stopping the automatic tilting of tilt mechanism when occasion requires; second, to furnish a simple and efficient means of altering the angle of the tilt mechanism, whereby the thickness of the butt of shingle is changed in relation to the point of shingle, and, third, a means of conveniently raising or lowering the tilting mechanism as a whole. I attain these objects by means of mechanisms hereinafter described, certain specific devices of which are shown by accompanying drawings.

Figure 1 is a front view of the mechanism, partly in section, showing the parts of machine to which my invention applies. The main frame of machine is removed for simplicity in drawings. Fig. 2 is a side view of the parts shown in Fig. 1. Fig. 3 is a top view of the same parts. Figs. 4 and 5 are detailed views, Fig. 5 being an alternative design which may be used in place of the arrangement shown in Fig. 4.

Similar letters refer to similar parts throughout the several views.

The drawings show part of a hand-feed shingle-machine, and my invention as applied to such machine will be described herein; but I do not limit my invention to such application only, as it can be incorporated into a power-feed machine by obvious changes.

The drawings show parts of a well-known type of shingle-sawing machine, said type consisting, primarily, of two main castings forming ends of the frame and to which the rest of machine is attached. Between the two end castings run rods, which serve as parts of the frame. On the back casting of frame is carried the vertical saw-mandrel carrying the saw and running in boxes. The upper pair of rods between end castings usually serve as slides for the carriage. In front of the saw and under the carriage are the tilt-works, which give the proper taper to the shingle, first permitting a butt to be cut from, say, the left-hand end of shingle-block, and then automatically tilting the other way to allow a butt to be cut from the right-hand end of the shingle-block. The carriage consists of a frame to slide on the upper bars of the main frame of machine and dogs sliding with and on the carriage to catch and hold the shingle-block.

The operation of such a machine in general is, first, when the carriage is at the end of its travel nearest the sawyer, to place a shingle-block on the tilt-table between the dogs and clamp it in the carriage by means of the dogs, and, second, to push the carriage forward over the saw and cut the shingle from the bottom of a saw block or bolt. The shingle falls off and carriage is, third, brought back. The action of returning the carriage automatically changes the tilt-table, so as to permit butt to be cut from the opposite end of shingle-block on the next cut. The fourth operation is, when the carriage is back again at the end of its travel, the dog is withdrawn, the block drops of its own weight upon the tilt-table, and the same cycle of operation ready to be gone through with for the next shingle. The sequence of the functions is then, first, dogging; second, sawing; third, returning carriage with consequent change of the tilt-works, and, fourth, undogging, to allow block to drop onto the tilt-table.

In the machine shown herewith, 1 is the front casting of frame; 2 2, the upper rods of frame, which form the slide for carriage; 3 3, the lower rods of frame, which act also as supports to the tilt-works; 4 4, the inclined ways on which tilt-works rest; 5 5, the adjusting-screws for tilt-works; 6, main frame of tilt-works, carrying the rest of the tilt mechanism; 7, the tilt-table proper, on which the shingle-block rests before each cut; 8 8, the cams, which by their rotary motion cause the tilt-table to incline from side to side alternately; 9, the star-wheel, which rotates the tilt-cams through the agency of the pivoted pawl 10 on the carriage.

11 is the handle grasped by the left hand of operator and used for double purpose of pushing the carriage and raising pawl 10 when it is desired to stop the automatic action of the tilt-works. This handle, as will be seen, is immovable in the direction of the carriage, but has a lateral movement. By this means the operator can at all times maintain a firm grasp on the handle and by it control the tilt-works.

12 is the dogging-handle, held in the right hand of the operator and used to push carriage and also to operate the dog on carriage.

13 is the small shaft on which cams 8 8 and star-wheel 9 are held.

14 is the cross-shaft, which acts as a pivot for the tilt-table, and in connection with the hand-wheel 15 is used to move the tilt-frame with its component parts on inclined ways 4 4.

16 represents the saw.

17 and 18 are the dogs used to hold the blocks when sawing. The right-hand dog 17 slides on the tubes 19 19, and is connected to handle 12 by the links 24 24 and tube 23. The left-hand dog 18 is held to tubes 19 19 by pins and can be adjusted for wide or narrow shingles by holes in the tubes.

The carriage is made of a framework of two malleable castings 20 and 21 and the two tubes 19 19.

22 is a slide arranged to catch the pawl 10 and to depress the upper end of it and so raise the lower end as to clear the saw when carriage is pushed forward. Slide 22 is attached to main frame of the machine.

Fig. 5, the detailed drawing, will be explained later.

Having described the machine on which my invention is used, I will now describe the details of said invention.

It is sometimes necessary to cut two or three shingles in succession with the butts all from one side of the block on account of a knot or imperfection in the block. To do this, it is necessary to stop the automatic working of the tilt-table. The operator, by swinging handle 11 to the left, raises pawl 10, so that on the returning motion of the carriage pawl 10 passes over star-wheel 9 without engaging therewith, and the tilt-works become inoperative, so that the next shingle is cut with its butt to the same side as the one previously cut. It will be seen from examination of the drawings that handle 11 has a foot to it, which projects under and engages with an extension to the pawl 10, so that a motion to the left of handle 11 raises pawl 10. The arrangement of this handle 11 and pawl 10 forms a part of my invention.

The second part of my invention relates to changing the angle of tilt, so that the angularity of shingle or relative thickness of the butt to the point can be made greater or less. The cams 8 consist of two sets of wings each, $a$ and $b$. The wings $a$ and $b$ start from or unite in a cylindrical surface at $c$. The wings $b$ form the axial section of a regular circular cone, decreasing in diameter from $c$ to $d$, while the wings $a$ are of a similar section of a similar cone and increase in diameter from $c$ to $d$. As the cones are similar the elements of the surfaces of the wings $a$ and $b$ form the same but opposite angles with the shaft 13. The two cams 8 8 are placed as shown in the drawings. The star-wheel, which rotates the cams, is held to shaft 13 by means of set-screw 24, seating in a small groove or keyway 25. The keyway and set-screw allow the star-wheel to move along the shaft when the set-screw 25 is loosened, yet do not allow star-wheel to turn on shaft, and so preserve the relation of the star-wheel to the wings of the cams. The star-wheel 9 is held from side play in frame 6 by two cross members in said frame. The cams 8 8 are held to shaft 13, when once adjusted, by double set-screws, and are only to be moved thereon to take up for wear. It will be seen that if set-screw 24 is loosened and shaft 13 slipped to the right, Fig. 3, until the circular cylindrical surface $c$ of cams 8 8 are under the cross-bars of table 7 and the cams are rotated by the star-wheel 9 no motion would be imparted to table 7, as the bearings of table 7 on cams 8 are cylindrical and there is no cause for tilt action. If, however, shaft be slipped back again to the left in position shown in drawings and shaft rotated by wheel 9, the tilt-table would be worked, one side of table riding on the large diameter of cone of one cam 8, while the other side of table 7 would ride on the small cone of the other cam. When star-wheel is turned one-fourth of a revolution, the positions would be reversed and the tilt-table inclined an equal amount to the opposite side. As the cones on cams 8 have the same angle it will be seen that there will be no lost motion between the table and the cams when once adjusted.

If shaft 13 is thrown to the left, so that ends $d$ of cams 8 8 are under the cross-bars of table 7, then cams are in position of greatest throw. Star-wheel 9 is provided with a square hub bearing upon a flat steel spring shown in Fig. 2 and marked "⁂ 31." This square hub and spring insures the star-wheel turning just one-fourth of a revolution.

It is not new to use cams such as here described, nor is the star-wheel with a spring and square hub new, nor is the combination of the cams and star-wheel new; but by holding star-wheel 9 from side motion and having a device whereby shaft 13 can slide in, but not turn in the star-wheel, I accomplish a result that hereto requires the entire resetting of cams 8. I have chosen to show a set-screw and key-seat as a means of accomplishing this end; but as there are several alternative means that could be employed to produce the same result of shifting shaft 13 and cams 8 across frame 6 without changing relation of cams 8 and star-wheel, I do not confine myself to said narrow construction.

The third part of my invention is to provide a means for lowering or raising the tilt-works as a whole. This becomes necessary when it is desired to cut a heavier or lighter shingle or when using machine as a box-board machine to cut different thicknesses of boards. When using machine for box-boards, the shaft 13 is slid to extreme right, so that top of tilt-table stands parallel to the plane of the saw. The tilt-table then rests on the cylindrical parts $c$ of the cams 8. Pawls 10 can be removed from the machine, the set-screws 24 taken out, or handle 11 held to the left, any of which means would make automatic tilt inoperative. The block or bolt would then rest on tilt-table and a board with parallel surfaces be cut. To regulate the thickness of boards cut, hand-wheel 15 is used. The hand-wheel has an annular groove in hub which fits into slot in main front casting. (Shown clearly in the drawings.) When hand-wheel 15 is turned, the threaded shaft 14, and with it frame 6, is drawn to or pushed away from the frame, and as it moves it travels on the inclined ways 4 and so alters the vertical position of the tilt-works, and thereby cuts different thicknesses off of the block.

Set-screws 5 are only used to adjust the frame 6 permanently on the slides 4 and when once adjusted so that frame 6 is parallel to saw need not again be touched. There are other ways employed now to get this vertical adjustment to the tilt-works; but I know of none which attains the result with as few parts, as conveniently, or as cheaply as by use of the inclined ways and the extension-shaft 14.

Sometimes it is desirable to provide for a quick means of dropping the tilt, as when there is a defect in the block which would necessitate cutting several shingles or boards before a good one could be obtained. Were it possible to drop the tilt-table from one-half to one inch or more, the entire defect in the block could be taken in at one cut and the next cut give a perfect shingle or board. In Fig. 5 I show a means whereby I accomplish this result in a simple and efficient way and yet retain quick and accurate adjustment, as before shown. The hand-wheel 15 is the same as before; but instead of being journaled in the slot in frame 1 it is held or journaled in the lever 26, which is pivoted at 28 and has a spring-pawl holding it tightly in the slotted arc 27.

When sawing regularly, pawl would rest in notch No. 29, and small adjustments would be made with the wheel 15. When it is desirable to drop the tilt, the lever 26 is drawn outward and the tilt-works slide down the inclined ways. The pin 30 permits of a swiveling action to the wheel 15. The pin 30 is also long enough and opening in lever 26 wide enough to permit hand-wheel 15 to move vertically in lever 26.

Having fully described my invention, what I claim as new, and desire to secure by Letters Patent, is—

1. In a shingle-sawing machine, the combination with a suitable frame, of the slidable carriage mounted therein, a saw, a tilt-table, mechanism for tilting the table, means for operating said mechanism, and a laterally-extending handle on said carriage immovable in the direction of movement of the carriage, said handle being movable at an angle to the line of movement of the carriage, and the handle thus moved operating to throw the means for operating the table-tilting mechanism into operative or inoperative position.

2. In a shingle-machine, the combination with a suitable frame, of a carriage mounted thereon, a tilt-table, a supporting-frame therefor, a shaft provided with fixed longitudinally-inclined cams coöperating with said tilt-table when said shaft is rotated, means for rotating said shaft upon the movement of the carriage, and suitable devices for adjusting said shaft and its cams relative to the tilt-table; substantially as described.

3. In a shingle-machine, the combination with a suitable frame, of a sliding carriage mounted thereon, a tilt-table, longitudinally-inclined cams for coöperating with said tilt-table, a shaft on which said cams are fixed, means for adjusting said shaft and its fixed cams relative to said tilt-table and for locking said shaft in its adjusted position, a star-wheel mounted on said shaft and provided with devices for locking the same to said shaft and preventing independent rotary movement on the shaft, a pawl on the carriage for operating said star-wheel, and a pivoted handle on the carriage having connections with said star-wheel pawl; substantially as described.

4. In a shingle-machine, the combination with a suitable frame, of a carriage mounted thereon, a tilt-table, a supporting-frame therefor, a shaft mounted in said supporting-frame and provided with longitudinally-inclined fixed cams coöperating with said tilt-table when said shaft is rotated, a star-wheel arranged on said shaft for rotating the same upon the movement of the carriage, suitable devices for lengthwise adjusting said shaft and its cams relative to the tilt-table, without destroying the register between the star-wheel and its operating medium, and means for throwing said operating medium into or out of operative relation to the star-wheel at will; substantially as described.

5. In a shingle-machine, the combination with a suitable frame of a carriage mounted thereon, a tilt-table, a supporting-frame therefor, longitudinally-inclined ways on which said supporting-frame is mounted, means for moving said frame and its carried tilt-table, along said cams to effect a vertical adjustment of said moving parts, a shaft mounted in said supporting-frame and provided with longitudinally-disposed fixed cams coöperating with said tilt-table when said shaft is rotated, a star-wheel arranged on said shaft for rotating the same upon the movement of the carriage, suitable devices for lengthwise adjusting said shaft and its cams relative to the tilt-table without destroying the register between the star-wheel and its operating medium, and means for throwing said operating medium into or out of operative relation to the star-wheel at will; substantially as described.

6. In a shingle-sawing machine, the combination with a suitable frame, of a movable carriage mounted therein, a saw, a tilt-table, means for tilting said table, a frame in which said tilt-table is mounted, screws arranged at the corners of said frame for adjusting said frame and its carried tilt-table vertically, means coöperating with said screws for vertically raising or lowering said frame and its carried tilt-table, a lever located outside the main framing of the machine for actuating said raising or lowering mechanism, and means for adjusting a connection between said lever and said tilt-frame, substantially as described.

In testimony whereof I hereto set my hand this 22d day of July, 1896.

GEORGE F. STEEDMAN.

Witnesses:
  EMIL H. SCHLUER,
  WM. F. LUPTON.